No. 699,453. Patented May 6, 1902.
C. B. COMEGYS.
WEIGHING MACHINE.
(Application filed June 13, 1901.)

(No Model.) 8 Sheets—Sheet 1.

WITNESSES:

INVENTOR
Courtney B. Comegys
BY
ATTORNEYS

No. 699,453. Patented May 6, 1902.
C. B. COMEGYS.
WEIGHING MACHINE.
(Application filed June 13, 1901.)
(No Model.) 8 Sheets—Sheet 3.

No. 699,453. Patented May 6, 1902.
C. B. COMEGYS.
WEIGHING MACHINE.
(Application filed June 13, 1901.)
(No Model.) 8 Sheets—Sheet 4.

No. 699,453. Patented May 6, 1902.
C. B. COMEGYS.
WEIGHING MACHINE.
(Application filed June 13, 1901.)
(No Model.) 8 Sheets—Sheet 5.

WITNESSES:
INVENTOR
Courtney B. Comegys
BY
ATTORNEYS

No. 699,453. Patented May 6, 1902.
C. B. COMEGYS.
WEIGHING MACHINE.
(Application filed June 13, 1901.)
(No Model.) 8 Sheets—Sheet 6.

WITNESSES:

INVENTOR
Courtney B. Comegys
BY
ATTORNEYS

No. 699,453. Patented May 6, 1902.
C. B. COMEGYS.
WEIGHING MACHINE.
(Application filed June 13, 1901.)
(No Model.) 8 Sheets—Sheet 7.

WITNESSES:

INVENTOR
Courtney B. Comegys
BY
ATTORNEYS

No. 699,453. Patented May 6, 1902.
C. B. COMEGYS.
WEIGHING MACHINE.
(Application filed June 13, 1901.)
(No Model.) 8 Sheets—Sheet 8.

WITNESSES:
A. R. Appleman Jr.
J. B. Owens.

INVENTOR
Courtney B. Comegys
BY
ATTORNEYS

UNITED STATES PATENT OFFICE.

COURTNEY B. COMEGYS, OF ASHGROVE, MISSOURI.

WEIGHING-MACHINE.

SPECIFICATION forming part of Letters Patent No. 699,453, dated May 6, 1902.

Application filed June 13, 1901. Serial No. 64,417. (No model.)

*To all whom it may concern:*

Be it known that I, COURTNEY B. COMEGYS, a citizen of the United States, and a resident of Ashgrove, in the county of Greene and State of Missouri, have invented a new and Improved Weighing-Machine, of which the following is a full, clear, and exact description.

This invention relates to a machine for weighing out merchandise by its value—that is to say, when properly set to weigh out the worth in merchandise of a certain sum of money and to automatically cut off the merchandise when the proper amount has been delivered. It is particularly adapted for use in connection with retailing sugar; but of course it is applicable to various other materials, as will be obvious.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
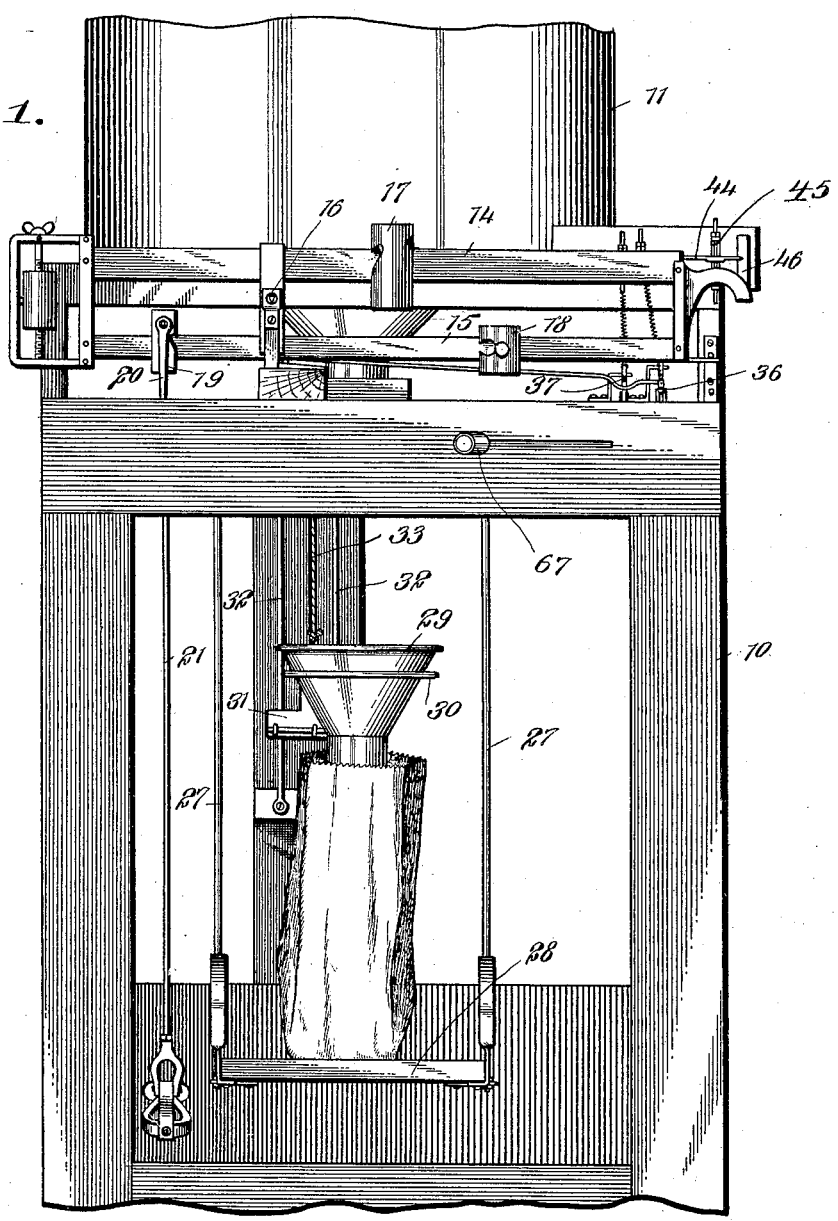
Figure 2:
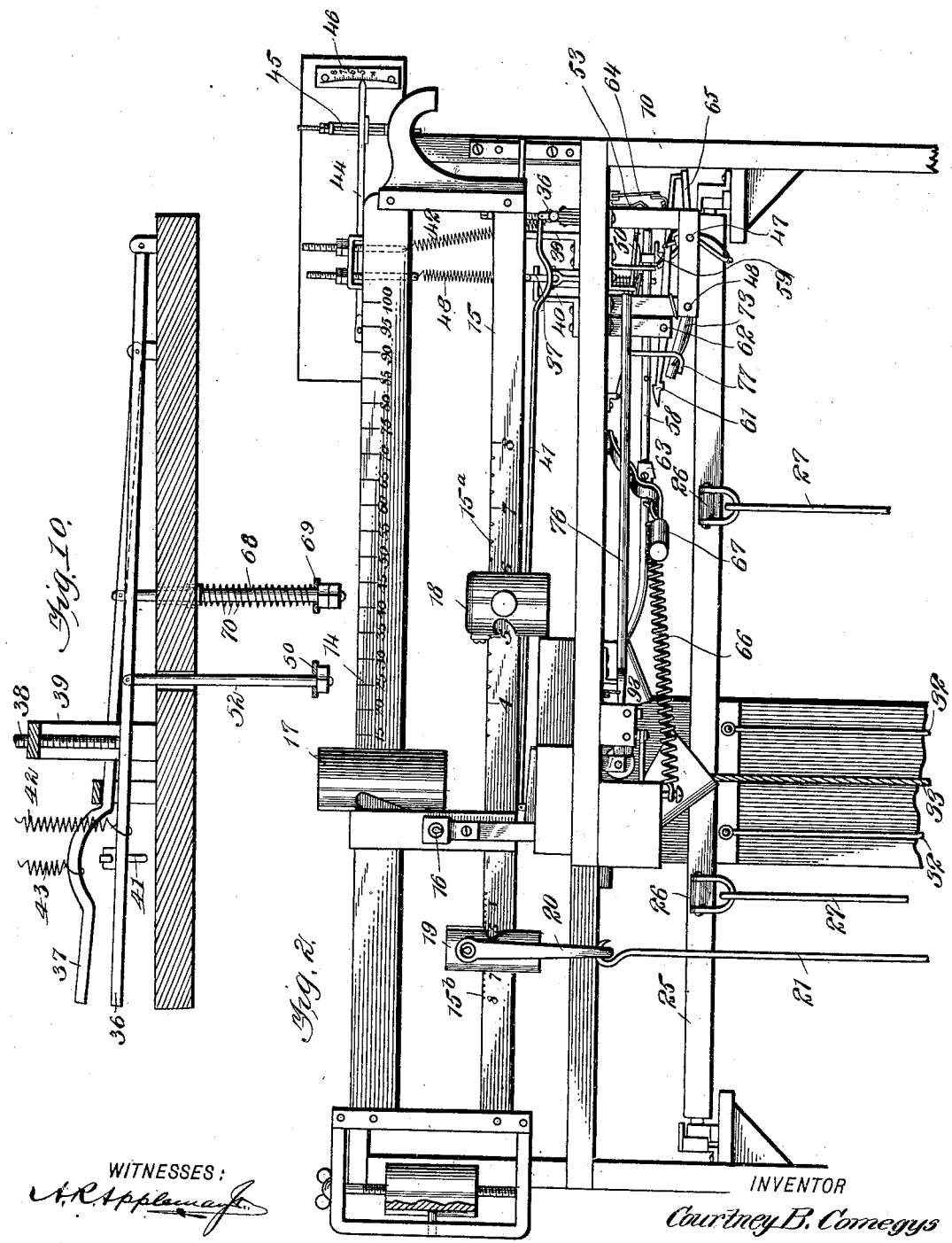
Figure 3:
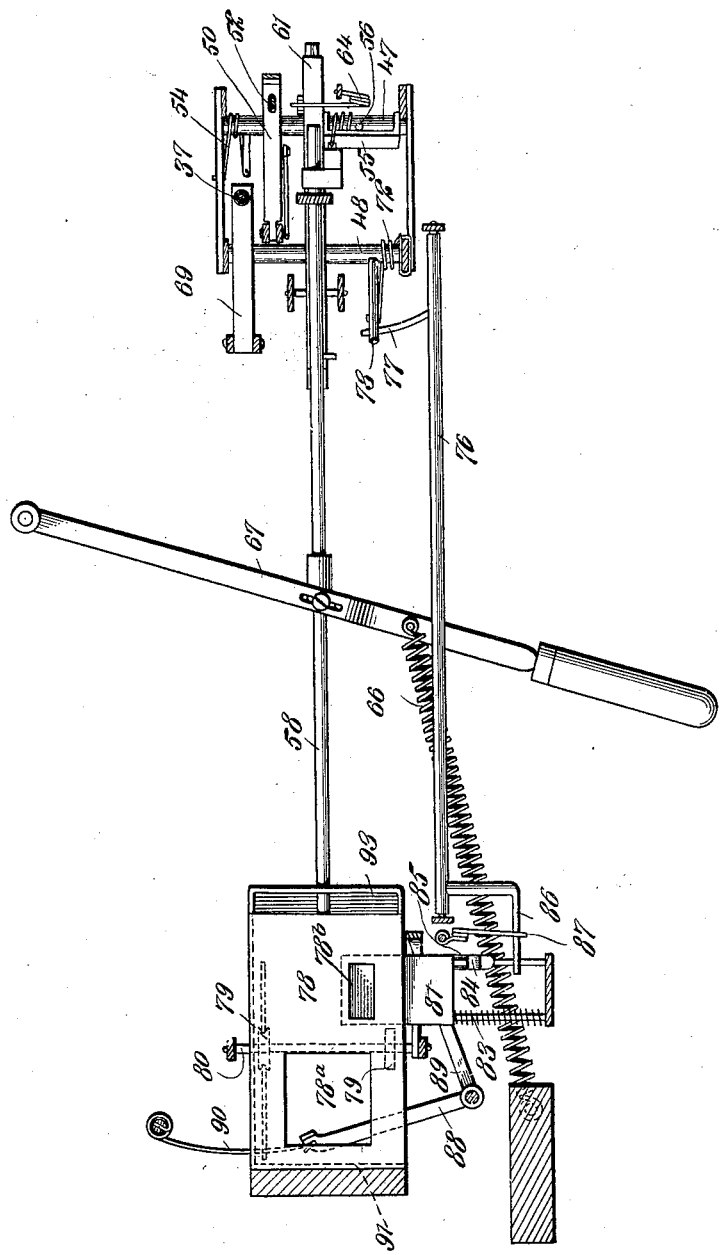
Figure 4:
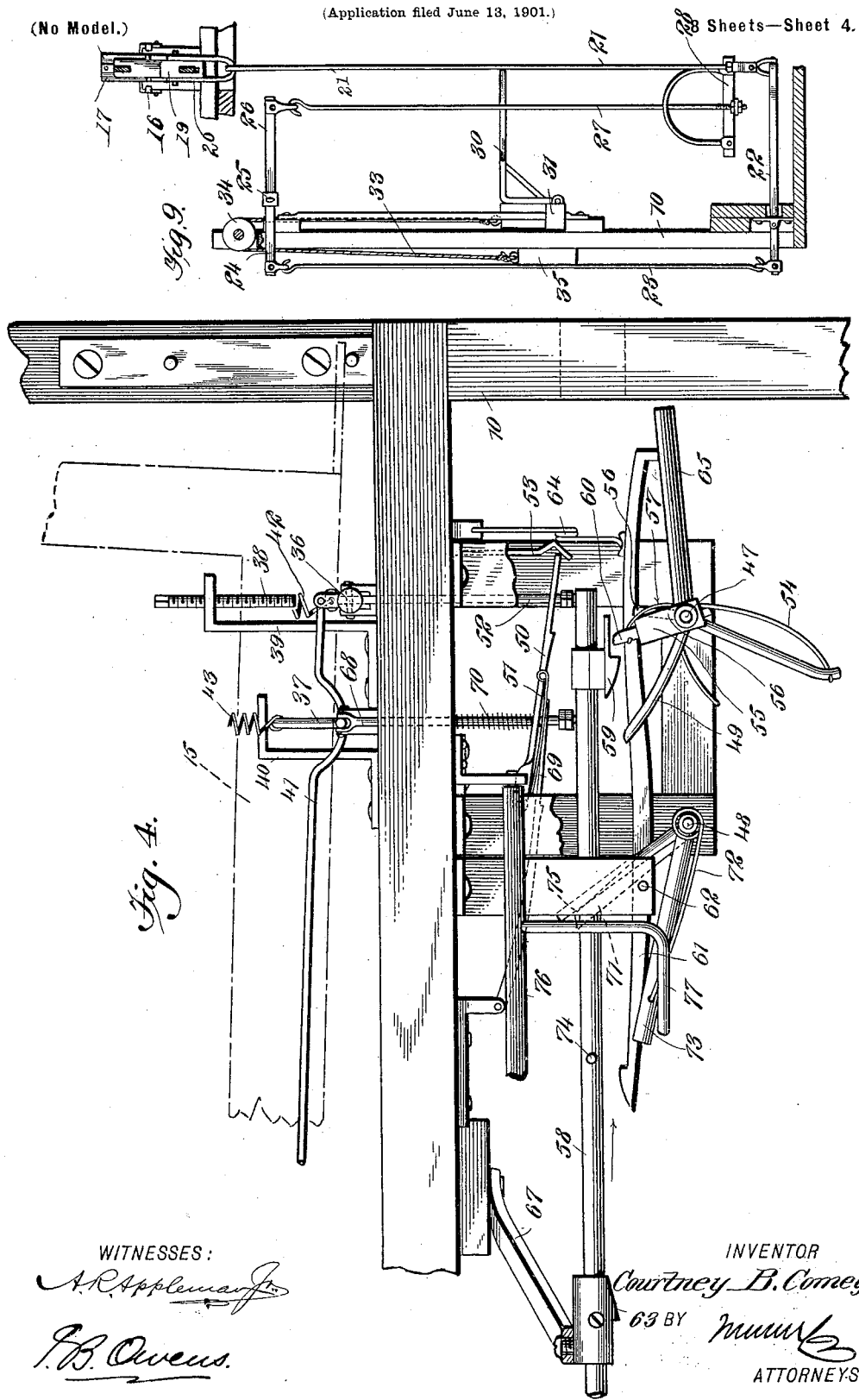
Figure 5:
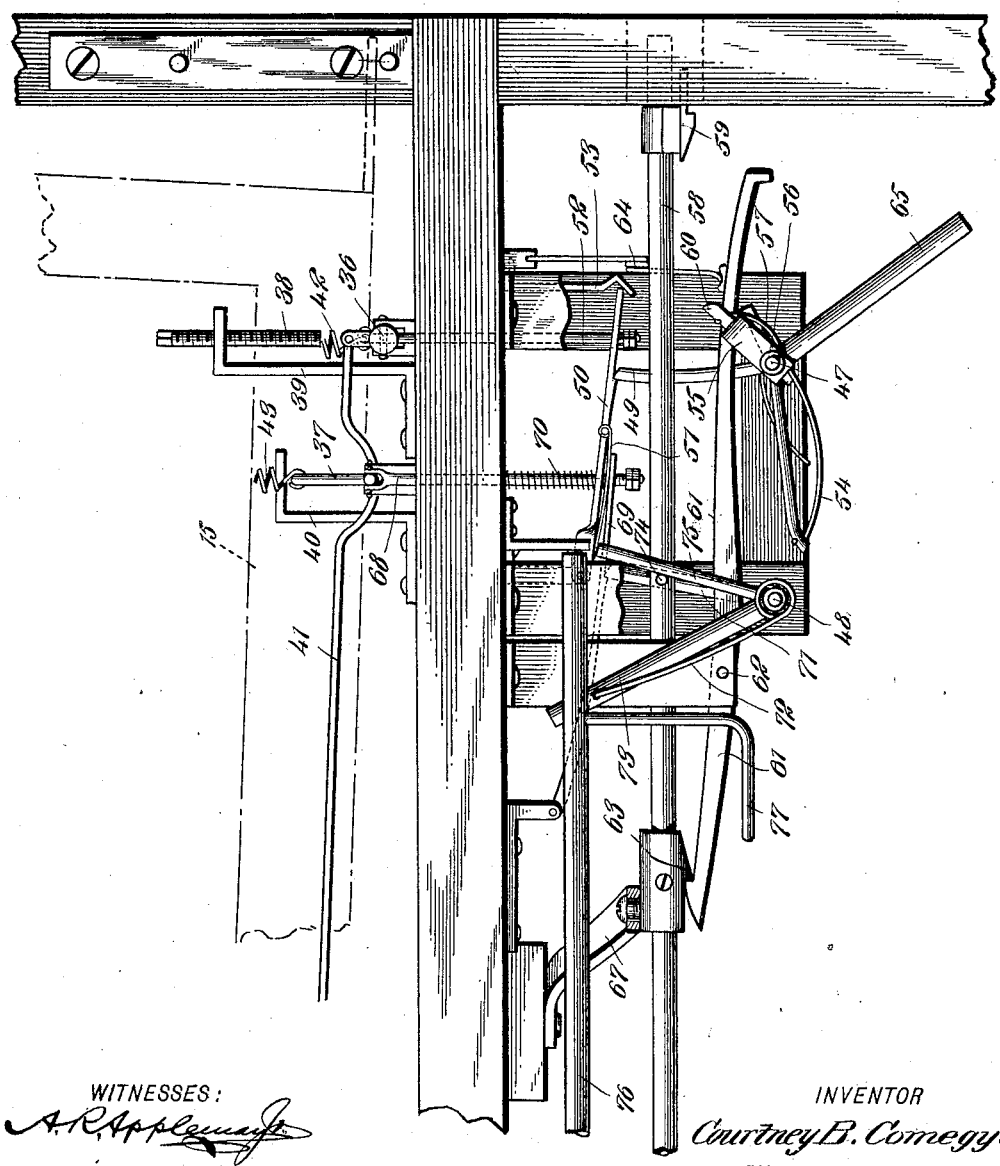
Figure 6:
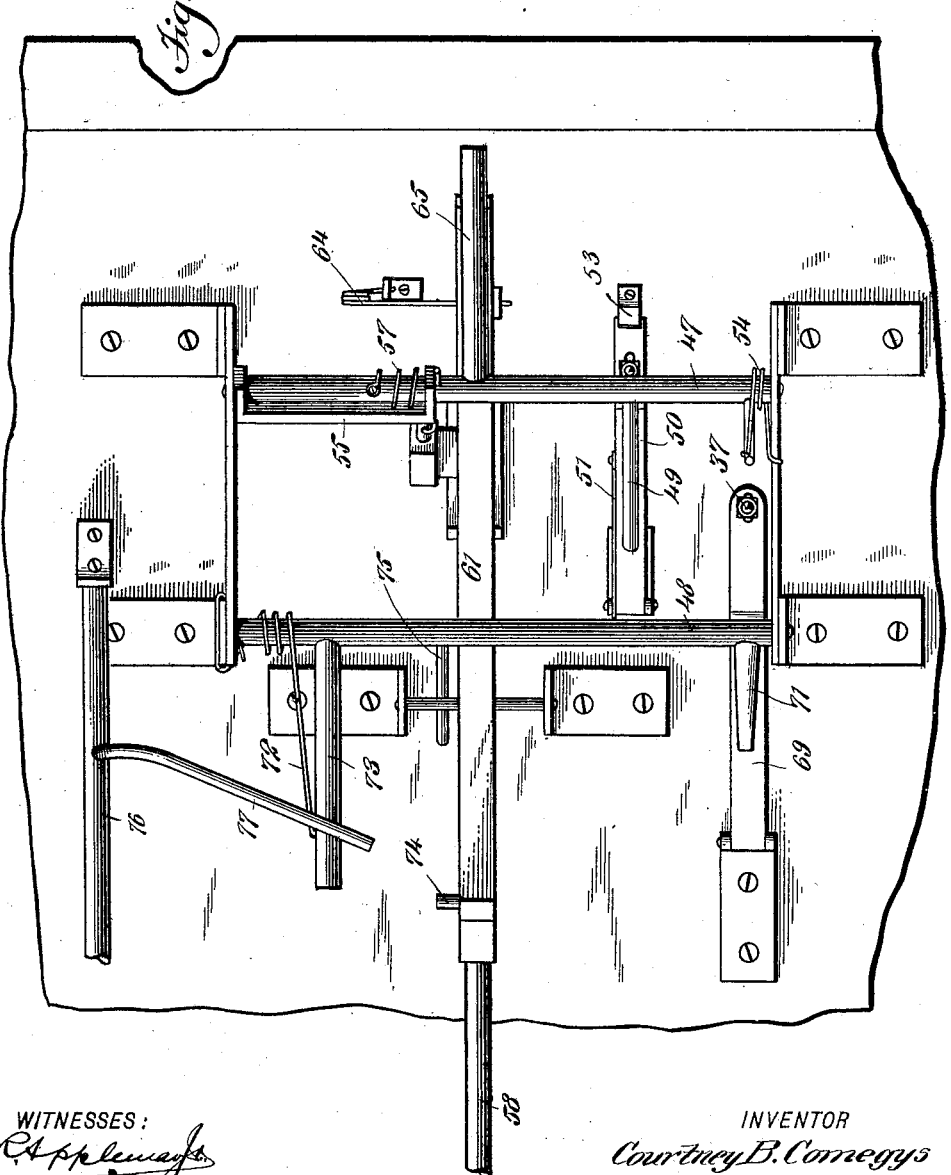
Figure 7:
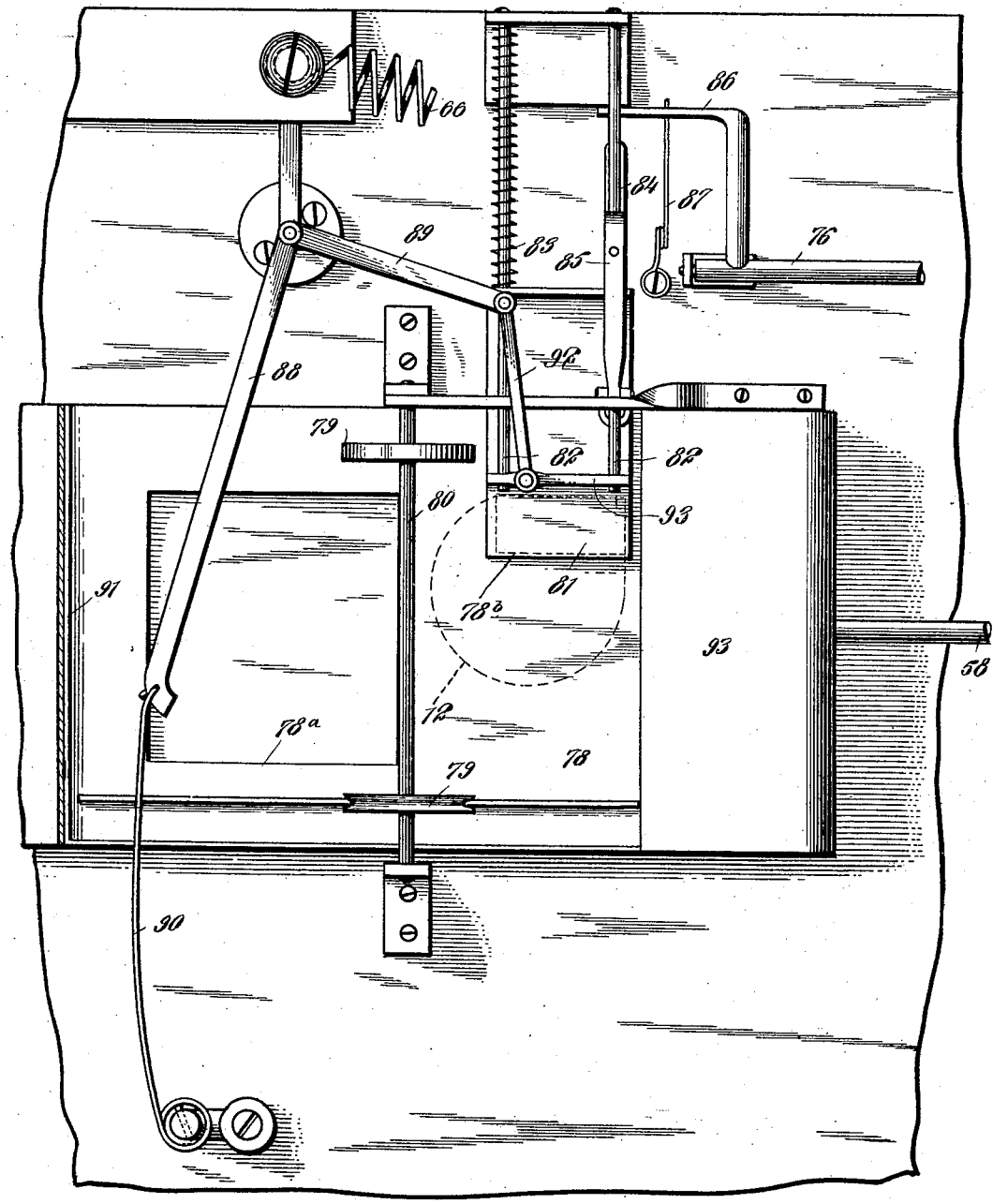
Figure 8:
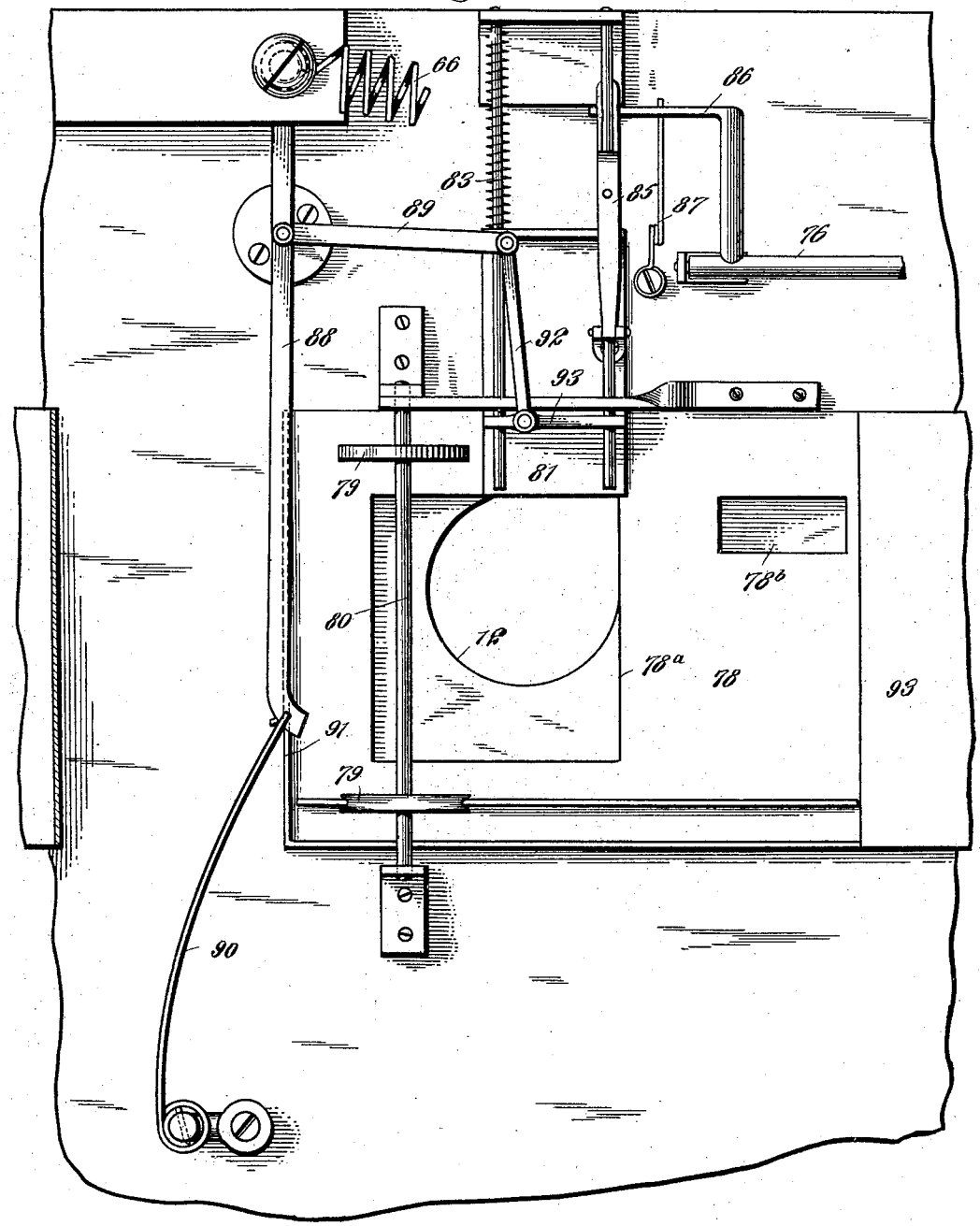

Figure 1 is a front elevation of the invention. Fig. 2 is an enlarged front elevation illustrating the mechanism of the machine. Fig. 3 is a top plan view of the cut-off devices and the mechanism for operating them. Figs. 4 and 5 are fragmentary front elevations of the devices for operating the cut-offs, such views showing the said devices in different positions. Fig. 6 is a bottom plan view of the mechanism shown in Figs. 4 and 5. Figs. 7 and 8 are bottom plan views of the cut-offs, said views showing the cut-offs in different positions. Fig. 9 is a reduced sectional view illustrating the manner of hanging the support for the receptacle into which the merchandise is delivered, and Fig. 10 is a sectional elevation showing particularly the trip-levers which coact with the scale-beam.

10 indicates a suitable framing for the apparatus, and 11 a hopper containing the merchandise. (See Fig. 1.) This hopper is mounted over the frame and has a discharge-orifice 12 in the bottom. (See Figs. 7 and 8.) The scale-beam comprises two parallel parts 14 and 15, the former being the value-beam and the latter the price-beam. These parts 14 and 15 of the beam are connected rigidly together, and the beam is fulcrumed suitably on the frame at the point 16. As shown in Fig. 2, the section 14 of the scale-beam is provided with graduations and figures representing money. The specific arrangement illustrated provides for figures from five cents up to one dollar, and on this portion of the beam 14 a weight or pea 17 is arranged. The beam 15 is provided with two graduated parts, (designated $15^a$ and $15^b$, respectively.) On the part $15^a$ is arranged a balance pea or weight 18, and on the part $15^b$ is arranged a sort of yoke or block 19, which is connected with the platform or support for the material to be delivered. The graduations $15^b$ represent the price of the merchandise per pound and the graduations $15^a$ are provided simply for enabling the balance-pea 18 to be adjusted in accordance with the position of the yoke or block 19.

The yoke 19 has a hanger 20 connected thereto, and to this hanger is connected a rod 21, which (see Fig. 9) passes down to and is connected with a lever 22, fulcrumed in the framing 10 and extending to the rear thereof. Connected with the rear end of the lever 22 is an upwardly-extending rod 23, which is joined to the rear arm 24 of a rock-shaft 25, mounted transversely in the frame. (See Figs. 2 and 9.) This rock-shaft 25 has two forwardly-projecting arms 26, from which depend rods 27, sustaining a platform or support 28. By means of this arrangement the platform is supported directly from the rock-shaft 25, but indirectly from the section 15 of the scale-beam. When the yoke or block 19 is adjusted according to the price per pound of the merchandise to be weighed or delivered, the equilibrium of the beam will of course be disturbed, and this equilibrium is restored by correspondingly adjusting the pea 18.

29 indicates a funnel, (see Fig. 1,) this funnel being held under the orifice 12 in the bottom of the hopper 11 and being arranged to direct the merchandise into the bag or other receptacle on the platform 28. The funnel 29 is held by a bracket 30, which is supported from a carrier 31, mounted to slide on guides 32, carried in the frame. This carrier 31 has a cord or other flexible connection 33 attached thereto, which cord passes up over a sheave 34 at the top of the frame 10 and thence downward to the rear thereof, the rear end carrying a weight 35, which balances the carrier 31 and bracket 30, so as to hold the bracket in any position desired and permitting the adjustment of the funnel 29 to suit the height of the receptacle placed on the platform 28.

As best shown in Figs. 2, 4, 5, and 10, there are mounted on the framing 10 two levers 36 and 37, these levers extending transversely of the beam 15 and under the same. The upward movement of the lever 36 is limited by a stop-screw 38, held in a bracket 39, and the upward movement of the lever 37 is limited by a bracket 40. The movement of the lever 36 is further guided by a hingedly-mounted arm 41, which is fastened adjacent to the free end thereof and extends transversely thereto, it being pivoted at its far end, as shown in Fig. 2. Connected with the levers 36 and 37 and tending to raise the same are springs 42 and 43. These springs are adjustably attached to a pivotally-mounted arm 44, mounted on the upper extremity of the frame 10. The free end of the arm 44 is provided with a device 45 for adjusting this arm across a scale 46, (see Fig. 2,) such scale bearing graduations corresponding with the graduations on the parts $15^a$ and $15^b$ of the beam-scale 15. The device 45 may consist of any desired means for adjusting the arm 44; but it is preferably a threaded rod connected to the arm 44 and having a nut bearing against a part stationary on the frame of the machine, as illustrated. Fig. 2 shows the beam-scale in its inactive position, in which position it is raised clear above the lever 36, and it is raised so as barely to contact with the lever 37, the springs 42 and 43 being so adjusted that the lever 37 swings higher than the lever 36. When the scale-beam drops to the position indicated by dotted lines in Figs. 4 and 5, both of the levers 36 and 37 are moved downward, and when the scale-beam returns the lever 36 is first released.

Suitably mounted in the frame 10 at points immediately below the levers 36 and 37 are two rock-shafts 47 and 48. The rock-shaft 47 is related to the lever 36 and the rock-shaft 48 to the lever 37. To this end the rock-shaft 47 is provided with an arm 49, which is capable of movement with the rock-shaft from the position shown in Fig. 4 to that shown in Fig. 5, in which said arm 49 engages with a slight shoulder on a trigger-plate 50. This trigger-plate is suitably pivoted on the framing of the machine, (at its left-hand end, referring to Figs. 4 and 5.) A spring 51, fastened to the frame near the pivot of the plate 50, presses the same downward, and a rod 52, connected with the lever 36, normally holds the trigger-plate raised above the position shown in Figs. 4 and 5.

53 indicates a device which may be of any suitable character—for example, a bent plate, as illustrated—which works with the free end of the trigger-plate 50 to limit its swinging movement. When the lever 36 is raised, as in Fig. 2, the trigger-plate 50 is moved upward correspondingly against the tendency of its spring 51, and should the shaft 47 then rock the arm 49 will clear the trigger-plate 50; but when the trigger-plate is lowered, as in Figs. 4 and 5, the arm 49 in rocking with the shaft 47 will engage with and be held by the trigger-plate, as shown in Fig. 5.

54 indicates a spring, (see Figs. 4 and 6,) which is coiled around in any suitable manner with the rock-shaft 47 and engaged with a part stationary on the frame of the machine and with an arm on the rock-shaft to hold it normally in the position shown in Fig. 4.

55 indicates a U-shaped bar mounted loosely on the shaft 47 and held yieldingly against a pin 56 on said shaft by means of a spring 57. This spring (see Fig. 6) is coiled around the rock-shaft 47 and is fastened thereto at one end and to the bar 55 at the other end. The spring 57 presses the bar 55 to the right (see Figs. 4 and 5) against the pin 56, so that as the bar 55 moves rightward it carries the shaft 47 with it; but leftward movement of the bar may be effected without influencing the rock-shaft 47. Mounted to slide in the frame 10 longitudinally of the scale-beam and transverse to the shafts 47 and 48 is a rod 58, which is provided with a detent 59, adapted to strike an extension 60 of the bar 55 and throw the bar, with the shaft 47, rightward from the position shown in Fig. 4 to that shown in Fig. 5.

61 indicates a latch fulcrumed at the point 62, which is intermediate its ends. The engaging point of this latch is at the left-hand end (see Figs. 4 and 5) and is arranged to lock with a shoulder 63 on the rod 58, holding said rod in the position shown in Fig. 5. The right-hand end of the latch 61 is pressed down by a spring 64, so that when the parts are in the position shown in Fig. 4 said end of the latch 61 engages an arm 65 on the rock-shaft 47. This arm holds the latch so that it is clear of the shoulder 63 on the rod 58; but when the shaft 47 is rocked, as in Fig. 5, the arm 65 passes out of engagement with the latch 61, and the spring 64 thereupon throws up the active or left-hand end of the latch 61, so that the shoulder 63 may engage therewith. Therefore as the rod 58 moves in the direction of the arrow in Fig. 4 it strikes the extension 60 of the bar 55 and throws the rock-shaft 47 into the position shown in Fig. 5, which also permits the active end of the latch 61 to move upward, so that the shoulder 63 may engage therewith, and by these devices the rod 58 is held in the position shown in Fig. 5. As shown in Fig. 2, a retractile spring 66 is connected with the rod 58 to move it leftward, and a handle 67 is connected with the rod 58 to facilitate moving it rightward. When the scale-beam moves upward, it releases the lever 36 from the position shown in Fig. 5, thus lifting the trigger-plate 50 and releasing the rock-shaft 47.

The spring 54 thereupon asserts itself and throws the rock-shaft back into the position shown in Fig. 4. The arm 65 of the rock-shaft 47 then strikes the right-hand end of the latch 61 and throws downward its point, whereupon the rod 58 is released, and the spring 66 throws it back to the position shown in Fig. 4. The lever 37 is connected by a rod 68 with a trigger-plate 69, similar to the trigger-plate 50, and pressed downward by a spring 70. When the lever 37 is moved downward, the trigger-plate 69 follows it; but the upward movement of the lever carries with it the trigger-plate. The rock-shaft 48 carries an arm 71, which is similar in function to the arm 49 in that it is arranged to engage with a shoulder on the trigger-plate 69, as indicated by the dotted lines in Fig. 5. The rock-shaft 48 is provided with a spring 72, which holds the rock-shaft normally in the position shown in Fig. 4. This spring may be arranged in any suitable manner. As here shown, it is connected with an arm 73 on the rock-shaft 48, the further function of which arm will be hereinafter brought out.

74 indicates a transverse pin or projection on the rod 58, such pin being arranged to strike against an arm 75 on the shaft 48, so that as the rod 58 moves into the position shown in Fig. 5 the pin 74 strikes the arm 75 and throws the rock-shaft 48 into the position also shown in said view. When the lever 37 is thrown down by the scale-beam, the trigger-plate 69 is moved into active position, and when the lever 37 moves upward upon the return of the scale-beam the trigger-plate 69 follows it, and thereupon the rock-shaft 48 is released, the spring 72 then acting on the rock-shaft to throw it back into the position shown in Fig. 4. As shown best in Figs. 2, 4, and 5, a rock bar or shaft 76 is mounted in the framing parallel with and adjacent to the plane of the rod 58. This rock-shaft is provided with a bent arm 77, (see Figs. 4 and 5,) which arm is in the path of the arm 73 on the rock-shaft 48 as said arm 73 moves downward into the position shown in Fig. 4. Therefore as the trigger-plate 69 releases the rock-shaft 48 said shaft turns back to the position shown in Fig. 4, and the arm 73 then strikes the arm 77 and imparts to the rock-bar 76 a partial turn. The purpose of this rock-bar will appear hereinafter. The operation just described is also indicated in Fig. 3.

As before mentioned, the hopper 11 has a discharge-orifice 12, which is indicated in Figs. 7 and 8. This orifice is commanded by a valve-plate 78, which is formed with a major orifice 78$^a$ and a minor orifice 78$^b$. The valve-plate 78 is connected with the rod 58 and it moves therewith. The valve-plate 78 is movable to place its major orifice in registry with the orifice 12 or its minor orifice in registry with the orifice 12. The valve-plate 78 is held snugly in position by means of guide-wheels 79 running on the under side thereof and carried on a transverse shaft 80, suitably mounted in the framing of the machine. Fig. 7 shows the valve-plate 78 with its orifice 78$^b$ in registry with the discharge-opening 12, and Fig. 8 shows the valve-plate 78 with its orifice 78$^a$ in registry with the opening 12. The orifices 12 and 78$^b$ are indicated by dotted lines in Fig. 7.

81 indicates a supplementary valve-plate, which is movable on rods or other suitable guides 82 in a line transverse to the line of movement of the plate 78, so that when the plate 78 is in the position shown in Fig. 7 the supplementary valve-plate 81 may cover the opening 78$^b$, and thus completely close the discharge-opening 12. This plate 81 is also movable out of the position shown in Fig. 7 to one side of the same, so as to uncover the opening 78$^b$.

83 indicates a spring, which engages the valve-plate 81 and presses the same normally into the position shown in Figs. 3 and 7.

84 indicates a shoulder formed on a rod or other member 85, which is in fast connection with the valve-plate 81. This shoulder 84 is adapted to be engaged by a bent arm 86 on the rock-bar 76. A spring 87 presses down on the arm 86 to hold it normally engaged with the shoulder 84. When the valve-plate 81 is moved back into the position shown in Fig. 8, the arm 86 engages by the action of the spring 87 with the shoulder 84, and the valve-plate 81 is held in this inactive position against the tendency of the spring 83. When the rock-shaft 48 moves down into the position shown in Fig. 4 and the arm 73 strikes the arm 77, the bar 76 is rocked and the arm 86 is thrown upward out of engagement with the shoulder 84, and the spring 83 thereupon throws the valve 81 into the position shown in Fig. 7.

88 and 89 represent the arms of a bell-crank lever, (see Figs. 3, 7, and 8,) and of these arms the former is pressed by a spring 90 and also is turned laterally at its end to be engaged by a flange 91 on the valve-plate 78, as shown in Fig. 8. The arm 89 of the bell-crank lever is connected by a link 92 with a cross member 93 on the valve-plate 81. As the rod 58 is moved into the position shown in Fig. 5 by a person manipulating the hand-lever 67 the valve-plate 78 is carried from the position shown in Fig. 7 to that shown in Fig. 8. During this action the flange 91 of the valve-plate 78 engages the arm 88 of the before-mentioned bell-crank, and the bell-crank is then moved, thus moving the supplemental valve-plate 81 from the position shown in Fig. 7 to that shown in Fig. 8 and causing the shoulder 84 to engage with the arm 86 of the bar 76, thus holding the valve-plate 81 in open position. The valve-plate 78 will be held in the same position, owing to the engagement of the shoulder 63 of the rod 58 with the latch 61.

When the two valve-plates are moved into the position shown in Fig. 8, the merchandise from the hopper 11 runs through the orifice 12 and its weight is borne on the scale-platform. When the scale-beam rises under this weight, the lever 36 is first permitted to rise. This releases the rock-shaft 47 and causes the latch 61 to be disengaged from the rod 58. The spring 66 then returns the rod 58 and the valve-plate 78 to the position shown in Fig. 7; but the valve-plate 81 retains the position shown in Fig. 8. Therefore the major orifice 78$^a$ of the valve-plate 78 is moved out of registry with the discharge-opening 12, and the minor orifice 78$^b$ is moved into registry with the opening. The merchandise continues, therefore, to run out through the minor opening 78$^b$, and therefore additional weight of the merchandise is placed on the scale-platform. Under the action of this additional weight the scale-beam will rise farther and in time will permit the lever 37 to rise sufficiently to release the rock-shaft 48. The rock-shaft 48 in returning to the position shown in Fig. 4 operates the bar 76, and the supplemental valve-plate 81 is thereupon released. This valve-plate then returns to the position shown in Fig. 7, and the flow of merchandise is entirely cut off. The various parts of the scale are adjusted so that when nearly all of the desired weight of the material has passed the orifice 78$^a$ of the valve 78 the valve will be operated to cut off the major supply and permit a small quantity to continue to pass by way of the minor orifice 78$^b$, and, further, the adjustments of the mechanism are such that when exactly the proper weight has been run out the return of the scale-beam to equilibrium will be complete, and therefore the lever 37 is permitted to move sufficiently to release the rock-shaft, which release results in the closing of the supplementary valve 81.

In using the invention, assuming that the merchant be dealing in sugar and that this sugar is for sale at five cents per pound, the yoke or block 19 should be adjusted at "5" on the scale 15$^b$. (See Fig. 2.) Then in order to balance the scale-beam the pea 18 should be moved to the figure "5" on the scale 15$^a$, as also shown in the view referred to—Fig. 2. Next the arm 44 should be adjusted by the devices 45 so that it points to the number "5" on the scale 46. This will so adjust the levers 36 and 37 that they will work in time with the other parts of the apparatus. When these adjustments have been made, they should be retained as long as sugar (assuming that sugar is being dealt with) retails at five cents per pound. If a change in price occurs, the parts mentioned above will have to be readjusted according to the new price. Should a customer desire forty cents' worth of sugar, it is simply necessary to adjust the pea 18 to "40" on the scale 14 of the scale-beam. This will cause the scale-beam to drop from the position shown in Fig. 2 to that shown by dotted lines in Figs. 4 and 5. A bag or other receptacle is placed on the platform 28, and the funnel 29 is adjusted so as properly to direct the flow of sugar into the bag. Then the hand-lever 67 is thrown to the right, opening the valve-plates 78 and 81. The sugar now flows out of the opening 12, and guided by deflector-plates it passes through the funnel 29 into the bag. When the proper weight of sugar is nearly reached, the scale-beam begins to move upward, and the first movement of the scale-beam results in moving the minor orifice 78$^b$ into the position shown in Fig. 7, whereupon a diminished flow of sugar follows, and when the exactly proper amount is delivered the upward movement of the scale-beam will be completed, and then the supplemental valve-plate 81 will move into the position shown in Fig. 7, thus completely cutting off the supply.

With this apparatus the merchandise may be accurately weighed, and all the operations are automatically performed except the setting of the pea 17 and the primary movement of the lever 67. In instances where a very small amount of sugar or other merchandise is to be sold it may perhaps be advantageous simply to manually set the rock-shaft 48 and also manually throw open the supplementary valve 81, and then when the proper value of merchandise has been delivered into the receptacle on the scale-platform the movement of the lever 37 will automatically close this valve. If desired, a hand-lever (not shown) may be provided for facilitating the manual movement of the valve 81.

Various changes in the form, proportions, and minor details of my invention may be resorted to without departing from the spirit and scope of my invention. Hence I consider myself entitled to such variations as may lie within the scope of my claims.

Having thus described my invention, I claim as new and desire to secure by Letters Patent—

1. The combination of means commanding a source of material supply, a scale-beam in two parallel parts, one of which is formed with a value-graduation and the other of which is formed with two graduations, one of which is a price-graduation, a pea on the value-graduation, a platform adjustably connected with the part of the scale-beam having the two graduations and at the price-graduation, a counterbalance-pea on the other graduated portion of the said beam and coacting with the platform in the manner specified, and means actuated from the scale-beam for controlling the devices for commanding the source of material supply.

2. The combination of a main sliding valve-plate having two orifices therein, a supplemental sliding valve-plate arranged to command one of the orifices in the main valve, and mechanism for successively actuating the valve-plates.

3. The combination of a main sliding valve-plate having two orifices therein, a supplemental sliding valve-plate commanding one of the orifices of the main valve, independent devices for actuating the valve-plates, and weighing devices connected with said valve-actuating devices to successively operate the same.

4. The combination of a source of material supply, a main sliding valve-plate commanding the same and having two orifices therein, a supplemental sliding valve-plate commanding one orifice of the main valve-plate, weighing devices, and means for independently operating the valve-plates, said means being successively actuated from the weighing devices.

5. The combination of a main valve-plate having two orifices, a supplemental valve-plate commanding one of the said orifices, means for opening the main valve, means for opening the supplemental valve, the supplemental-valve-opening means being actuated from the main valve, and independently-operated devices for returning the valves to closed position.

6. The combination of a weighing device, a lever, a spring actuating the lever, the lever being arranged to be moved contrary to the spring by the weighing device, a valve, a trigger-plate, controlled by the lever, and a connection between the valve and trigger-plate.

7. The combination of two independently-operated valves, two spring-pressed levers, a trigger-plate actuated by each lever, a means connected with each valve, said means being respectively releasably held by the trigger-plates, and a weighing device actuating the levers against the action of their springs.

8. The combination of a scale-beam, a lever adapted to be moved in one direction by the beam, a pivoted arm, a spring connected with the lever and arm, a scale bearing graduations corresponding to the graduations of the scale-beam, and means for adjusting the free end of the arm across the said scale, as set forth.

9. The combination of a valve, means tending to close it, a rod connected with the valve, a latch serving to engage and hold the rod, a rock-shaft, a part of which is engageable with the latch to release it, a trigger-plate releasably holding a part of the rock-shaft, a weighing device, and means actuated by the weighing device for moving the trigger-plate to release the rock-shaft.

10. In a weighing-machine, the combination with a scale-beam, of a spring-actuated valve-plate having a major and minor orifice, a locking device controlled by the scale-beam for locking the valve-plate with its major orifice in position to receive the discharge, a supplemental valve controlling the minor orifice of said plate, and means controlled by the scale-beam for operating the supplemental valve to cause it to close the said minor orifice, as set forth.

11. In a weighing-machine, the combination with a scale-beam, of a main valve having a major and a minor orifice, a supplemental valve controlling the minor orifice of the main valve, a locking device for locking the main valve in position, means controlled by the scale-beam for releasing the locking device, a locking device for the supplemental valve, and means controlled by the scale-beam for releasing the locking device of the supplemental valve, as set forth.

12. In a weighing-machine, the combination with a scale-beam, of a main valve having a major and a minor orifice, a supplemental valve for the minor orifice of the valve, levers arranged under the scale-beam, and arranged to follow the movement thereof, a locking device for the main valve, means controlled by one of the said levers for releasing the locking device, a locking device for the supplemental valve, and means controlled by the other lever for releasing the locking device of the supplemental valve, as set forth.

13. In a weighing-machine, the combination with a scale-beam, a main valve having a major and a minor orifice, and a supplemental valve for the minor orifice of the main valve, of two spring-actuated levers arranged under the scale-beam, a sliding and spring-pressed rod connected with the main valve, a latch for engaging the said rod, means controlled by one of the levers for releasing the latch from the said rod, a locking device for the supplemental valve, and means controlled by the other lever for releasing the locking device of the supplemental valve, as set forth.

14. In a weighing-machine, the combination with a scale-beam, a main valve having a major and a minor orifice, and a spring-pressed supplemental valve for the minor orifice of the valve and working at right angles to the said valve, of two pivoted and spring-pressed levers arranged under the scale-beam, one of the levers being arranged to swing higher than the other, a sliding and spring-pressed rod connected with the main valve, a pivoted latch for engaging the said rod, means controlled by one of the levers for releasing the latch, a rock-shaft provided with means for engagement with the supplemental valve for locking the same in position, and means controlled by the other lever under the scale-beam for operating the rock-shaft, as set forth.

15. In a weighing-machine the combination with a scale-beam, and a spring-pressed valve-rod, of a spring-actuated member under the scale-beam, a spring-pressed latch for locking the valve-rod, a rock-shaft, means controlled by the spring-pressed member for locking the rock-shaft, and means carried by the rock-shaft for holding the latch disengaged from the valve-rod, as set forth.

16. In a weighing-machine, the combination with a scale-beam, and a spring-pressed valve-rod, of a spring-pressed lever under the scale-beam, a spring-pressed latch for locking the valve-rod, a rock-shaft provided with arms one of which is adapted to hold the latch disengaged from the valve-rod, and a trigger-plate connected with the lever and with which the other arm of the rock-shaft engages, as set forth.

17. In a weighing-machine, the combination with a scale-beam, and a spring-pressed valve-rod, of a pivoted and spring-pressed lever under the scale-beam, a pivoted and spring-pressed latch for locking the valve-rod, a rock-shaft provided with arms one of which is adapted to hold the latch out of engagement with the valve-rod, a pivoted and spring-pressed trigger-plate connected with the said lever and with which the other arm of the rock-shaft engages, and means for limiting the swinging movement of the trigger-plate, as set forth.

18. In a weighing-machine, the combination with a scale-beam, and a spring-pressed valve-rod provided with a detent, of a pivoted and spring-pressed lever under the scale-beam, a pivoted and spring-pressed latch for locking the valve-rod, a rock-shaft provided with arms, one of which is adapted to hold the latch out of engagement with the valve-rod, a pivoted and spring-pressed trigger-plate connected with the lever and with which the other arm of the rock-shaft engages, a bar loosely mounted on the rock-shaft, and with which the detent of the valve-rod is adapted to engage, and a spring having one end secured to the shaft and the other to the bar, as set forth.

19. In a weighing-machine the combination with a scale-beam, and a spring-pressed valve, of a pivoted and spring-pressed lever under the scale-beam, a rock-shaft provided with an arm, a trigger-plate connected with the said lever and with which the arm of the rock-shaft engages, a locking device for the said valve, and means for operating the locking device from the rock-shaft, as set forth.

20. In a weighing-machine the combination with a scale-beam, and a spring-pressed valve, of a pivoted and spring-pressed lever under the scale-beam, a rock-shaft provided with an arm, a trigger-plate connected with the said lever and with which the arm of the rock-shaft engages, a second rock-shaft provided with an arm for engaging the valve, and means for operating the second rock-shaft from the first, as set forth.

21. In a weighing-machine the combination with a scale-beam, and a spring-pressed valve, of a pivoted and spring-pressed lever under the scale-beam, a rock-shaft provided with arms, a trigger-plate connected with the lever and with which one of the arms of the rock-shaft engages and a second rock-shaft provided with arms one of which engages the valve, and the other an arm of the first-named rock-shaft, as set forth.

22. In a weighing-machine the combination with a main valve-plate having a major and a minor opening, and means for operating the same, of a supplementary valve-plate for controlling the minor opening and operating transversely to the main valve-plate, and a pivoted and spring-pressed bell-crank lever having one member connected with the supplementary valve-plate and its other member adapted to be engaged by the main valve-plate, as set forth.

23. In a weighing-machine the combination with a "main" valve-plate having a major and a minor opening, and means for operating the same, of a supplementary spring-pressed valve-plate for controlling the minor opening and operating transversely to the main valve-plate, a pivoted bell-crank lever, a link connecting one member of the lever with the supplementary valve-plate, and a spring having one end secured to a fixed support and its other end to the other member of the bell-crank lever, the member of the bell-crank lever to which the spring is secured being adapted to be engaged by the main plate, as set forth.

24. In a weighing-machine, the combination with a main valve-plate having a major and a minor opening, and means for operating the same, of a supplementary and spring-pressed valve-plate for controlling the minor opening and operating transversely to the main valve-plate, a pivoted and spring-pressed bell-crank lever having one member connected with the supplementary valve-plate and its other member adapted to be engaged by the main valve-plate, and a locking device for holding the supplementary valve-plate open, as set forth.

25. In a weighing-machine the combination with a scale-beam, and levers arranged transversely under the scale-beam, of a pivotally-mounted arm, springs secured to said arm and to the levers, a scale, and means for adjusting the arm with respect to the scale, as set forth.

26. A weighing-machine, comprising a scale-beam, a platform connected with the scale-beam, a hopper, a spring-pressed main valve-plate having a major and a minor opening, means for holding said plate with its major opening in register with the hopper, a spring-pressed supplementary valve-plate for controlling the minor opening of the main valve-plate, means controlled by the scale-beam for releasing the main valve-plate whereby the minor opening thereof will be brought into register with the hopper, a locking device for holding the supplementary valve-plate from over the minor opening of the main valve-plate, and means controlled by the scale-beam for releasing the locking device, as set forth.

27. A weighing-machine, comprising a scale-beam, a platform connected with the scale-beam, a hopper, a spring-pressed main valve-plate having a major and a minor opening, a locking device for holding the said plate with its major opening in register with the hopper, a spring-pressed supplementary valve-plate for controlling the minor opening of the main valve-plate, said supplementary valve-plate working at right angles to the main plate a locking device for holding the supplementary valve from over the minor opening on the main valve-plate, two spring-pressed levers arranged under the scale-beam, swinging and spring-actuated arms for releasing the locking devices of the main and supplementary valve-plates, and means controlled by the said levers for holding the arms in inactive positions, as set forth.

28. A weighing-machine, comprising a scale-beam, a platform connected therewith, a hopper, a spring-pressed main valve-plate having a major and a minor opening, a locking device for holding the main valve-plate with its major opening in register with the hopper, a spring-pressed supplementary valve-plate for controlling the minor opening of the main valve-plate, said supplementary valve-plate working at right angles to the main valve-plate, a locking device for holding the supplementary valve-plate from over the minor opening of the main valve-plate, two spring-pressed levers arranged under the scale-beam, a swinging and spring-pressed arm for releasing the locking device of the main valve-plate, means controlled by one of the said levers for locking the said arm in inactive position, a second swinging and spring-pressed arm, means controlled by the other lever for holding the last-named arm in inactive position, and means for releasing the locking device of the supplementary valve-plate from the said second swinging arm, as set forth.

29. A weighing-machine, comprising a scale-beam, a platform connected therewith, a hopper, a main valve-plate having a major and a minor opening, a spring-pressed and sliding rod connected with the valve-plate, a pivoted latch for engaging the sliding rod to hold the valve-plate with its major opening in register with the hopper, a spring-pressed supplementary valve for controlling the minor opening of the main valve-plate, said supplementary valve-plate working at right angles to the main valve-plate, a rock-shaft provided with an arm for engaging the supplementary valve-plate to hold it from over the minor opening of the main valve-plate, two spring-pressed levers arranged under the scale-beam, a rock-shaft provided with arms, one of which is adapted to engage the latch to release it, a trigger-plate connected with one of the levers and with which the other arm of the rock-shaft is adapted to engage, a second rock-shaft provided with arms, one of which is adapted to operate the rock-shaft which locks the supplementary valve-plate, and a second trigger-plate connected with the other lever and with which the other arm of the rock-shaft is adapted to engage, as set forth.

In testimony whereof I have signed my name to this specification in the presence of two subscribing witnesses.

COURTNEY B. COMEGYS.

Witnesses:
  E. H. YOUNG,
  H. E. SMITH.